UNITED STATES PATENT OFFICE.

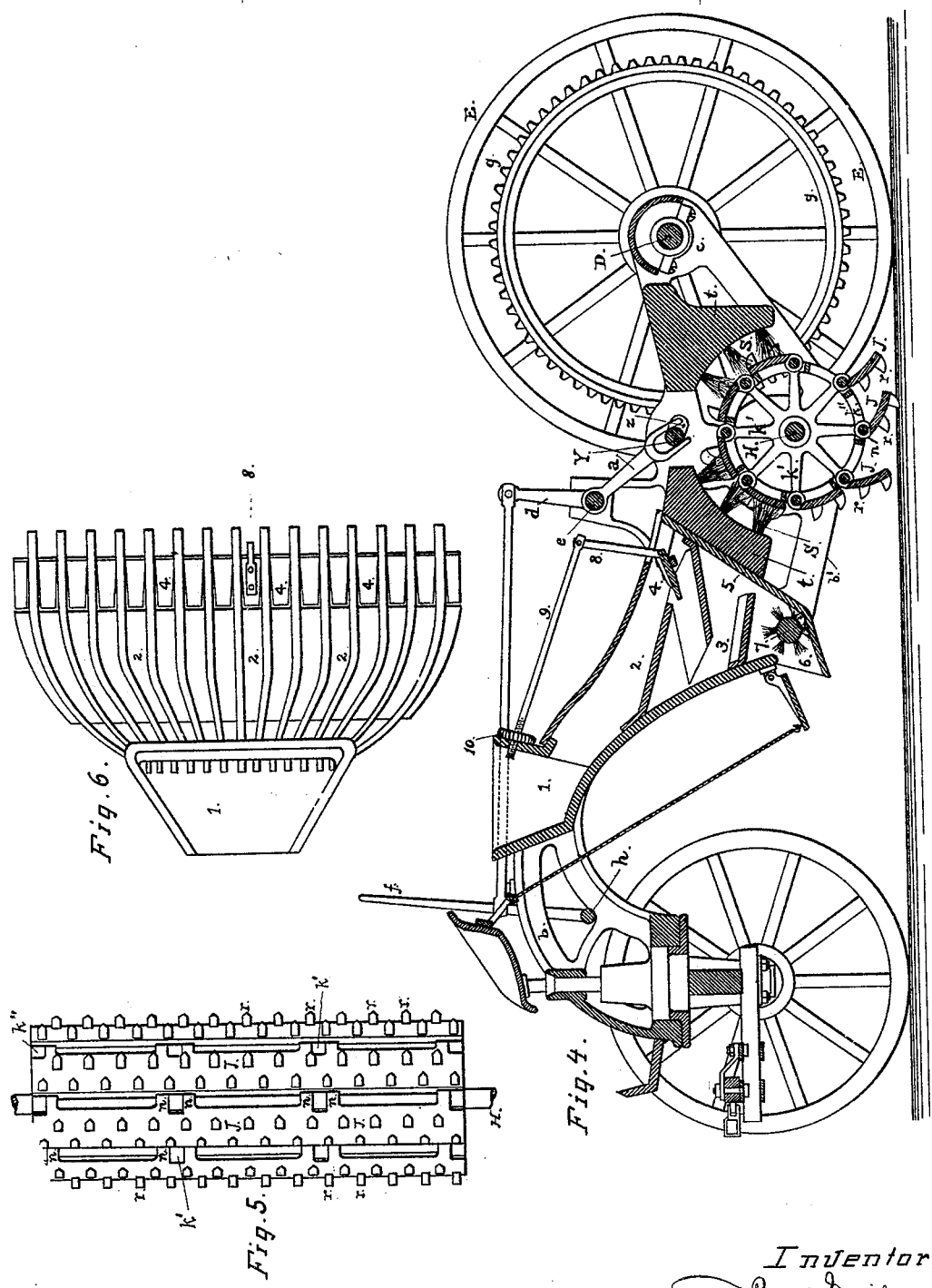

BUDD SMITH, OF SAN FRANCISCO, CALIFORNIA.

ROTARY HARROW AND CLOD-BREAKER.

SPECIFICATION forming part of Letters Patent No. 287,479, dated October 30, 1883.

Application filed December 15, 1881. (No model.)

*To all whom it may concern:*

Be it known that I, BUDD SMITH, of the city and county of San Francisco, in the State of California, have invented certain new and useful Improvements in a Rotary Harrow and Clod-Breaker; and I do hereby declare that the following is a full, clear, and exact description of the same, reference being had to the accompanying drawings.

My invention has reference to an improved harrow and clod pulverizer for breaking up and disintegrating sod and soil, destroying weeds, covering seeds, and for other purposes of work where ground is to be stirred up and leveled.

In my improved harrow, as will be more fully and particularly described hereinafter, provision is made for the combination, connection, and joint operation in the same frame and running-gear, with the harrow, of a means or device for sowing seed or grain broadcast in front of the track of the harrow, whereby the same machine is adapted for use in sowing and distributing seeds and covering them at the same operation. This construction also permits the machine to be utilized in distributing and working fertilizers and manures into the soil.

My improvements relate, first, to a novel harrow and clod-pulverizer, consisting of a number of segmental plates hinged to and forming the surface and periphery of a cylindrical frame or roller, to which a revolving motion is imparted by suitable mechanism as it is drawn along over the surface of the ground. These plates are attached at one side or edge to the surface of the frame or roller by hinge-joints in such manner that by the revolving motion of the roller they are alternately thrown out radially from its periphery into a position to drop against and be drawn over the soil beneath them as the machine progresses, and are then folded or brought back into place and position on the roller. By this construction and mode of operation the harrow has both a breaking and pulverizing action and a harrowing and leveling operation as it is drawn over the ground.

The second part of my invention consists in the combination, with the revolving harrow and clod-pulverizer, of novel means for giving to it the required movement of revolution during the progressive movement over the ground, by which also the harrow can be thrown into and out of action at any time during work.

Another part of my improvement relates to a novel frame and running-gear for supporting and carrying the revolving harrow in position for work, and also for receiving and holding in working relation to the harrow a seed, grain, fertilizer, or manure hopper and broadcast distributing device, by means of which, when desired, the operations of sowing or distributing such matter and of covering it up or harrowing it into the soil can be performed simultaneously by and during the one forward movement or progression of the machine. By means of this part of my improvement the harrow can be employed in operating upon the soil to bring it into proper condition for sowing, and then, by placing within the frame in front of the harrow a seed sowing and distributing device, the same machine can be used successfully and to great advantage in sowing and covering seeds and in other and similar operations.

In the accompanying drawings herein referred to, Figure 1 is an elevation of my improved machine with the seed-sowing device placed therein in position to operate in connection with the revolving harrow. Fig. 2 is a plan or top view of the frame with the rear wheels, the front running-gear, and the harrow and connected mechanism all removed. Fig. 3 is a side view, in detail, of the mechanism by which the harrow-frame or cylinder is raised and lowered to bring it out of or throw it into action. Fig. 4 is a vertical section taken longitudinally through the center of the machine, the seed-distributing device being shown in place in the frame for the purpose of illustrating the manner in which the machine will operate in sowing seed and other matter and covering it or working it into the soil. Fig. 5 is a top view of the cylinder or roller which constitutes the harrow and clod-pulverizer. Fig. 6 is a top view of the seed-distributing device with its top or cover removed.

A represents the frame that carries and affords bearings for all the operative parts and mechanism of the harrow. It consists of an arched front portion or goose-neck, $b$, that is adapted to fit on the king-bolt or fifth-wheel of the axle of a set of front wheels of ordinary construction, such as may be furnished from a farm-wagon, and from this point $b$ curved side bars, $b'\ b'$, extend backward and downward in a regular curve, diverging from each other to a point about midway between the front and rear ends of the frames, from which point these side bars run straight or parallel with each other to the rear, where they terminate in or are joined to boxes $c\ c$, that receive the axles D D of the hind wheels, E E. These side frames, $b'\ b'$, thus spring from the front point of attachment for the forward running-gear with an upward curve, to give space beneath for the front wheels in turning, and then they extend with a reverse curve as they run backward to the boxes $c$, in order to bring points of bearing low enough for the journals of the harrow-cylinder and for the mechanism by which it is raised and lowered from and into work. By this construction a space is afforded between the side frames and in front of the harrow-cylinder, into which a seed, grain, or fertilizer receptacle can be adjusted and secured in a position to distribute its contents in front of and across the track of the harrow as the machine advances over the ground. When the machine is used for harrowing and like operations—such as breaking up rough ground and stirring and leveling soil—the receptacle is readily removed from the frame without disturbing or requiring readjustment of the harrow or any of its connected mechanism. The wheels E E support the rear of the frame and furnish the means for driving or producing the revolving movement of the cylinder or roller B. To each one is secured a large toothed ring or gear, $g$, which is fixed and placed concentrically on the inner side of the wheel, being fastened to the spokes by means of clips, or by any other means that will secure it firmly to the wheel or its axle. These gears $g$ give motion to a horizontal shaft, H, held in bearings at each end in the side frames, $b'\ b'$, and having secured to its ends the gears or large pinions $m$, which are outside of the bearings, and in position to engage with the gear-rings $g$, so that as the wheels E travel over the ground in a forward direction the shaft H is given a rotation in the opposite direction, or toward the rear of the machine. This shaft H is made the axis of a skeleton cylinder or roller, B, on which I hinge a number of heavy metal plates, J, of a curved or segmental shape, so that when closed they shall lie around the whole circumference and form the surface of the roller, and when opened or thrown outward they shall be attached to the cylinder or roller at and along one edge or side only. In the construction of the roller herein shown I have fixed upon the shaft H, at each end, inside of its bearings, an open head, $k$, formed with arms $k'\ k'$, radiating from a central hub, and between these sets of arms or spokes I secure the longitudinal bars or rods $p\ p$. Between these outer heads or supports I also place intermediate radial arms or supports, $k''\ k''$, at intervals in the length of the rods $p$, and in this manner I form a skeleton cylinder or roller to receive and operate the segmental harrow-plates. The plates J are curved to conform to the shape or size of the cylinder, and they are hung at one edge or side by means of the lugs $n$, through which the rods $p\ p$ pass. They are placed in horizontal rows or series, one upon each rod $p$, and in number governed by the length of the roller or the size of the plate employed, and as many of such rows or horizontal sets as will cover the roller. In the drawings, however, I have shown the full length of the roller occupied by a single length of wing or plate. The attachment of the plates to the rods $p$ will be at and along the upper side when looking at the front of the roller, so that in the rotation of the roller in the backward direction these plates, at the front and while passing upward, will lie closed upon the surface; but after passing the top, and as their points of connection pass below their free edges, the plates in each horizontal row will turn outward from the surface of the roller and take a position tangent to the roller as they drop against the ground behind it. By this construction, therefore, the rotation of the shaft H in a backward direction will cause these segment-plates to open outward at the back of the roller and take a position to strike and be drawn along against the surface beneath, and then, after passing under the roller, to be closed or shut into place upon its surface as they are brought around to the front. This gives a large extent of harrowing and raking surface, and yet enables me to employ a very small roller or cylinder in proportion, and consequently I can provide in a small and compact shape a machine having great working capacity. The rapid revolution of the harrow, in addition to its forward travel, also gives an increased raking action of the plates against the surface being passed over, and, besides the striking action produced by the plates turning or falling outward from the roller as they approach the ground, has a good effect in breaking up and pulverizing lumps and clods of earth; and this pulverizing action, as well as the general raking or harrowing action in such a harrow, is very much greater than could be obtained from a single surface in dragging it over a given piece of ground, or from a rotating drum or cylinder armed with spikes or teeth.

Upon the outer surface of the pivoted segment-plates are teeth or projecting points $r\ r$, set either straight or curved, so as to present a number of hooks or points to engage with the surface over which the plates are drawn, and to operate as the teeth of an ordinary harrow. These spiked or armed surfaces in their movements are more or less liable to become clogged and filled up by adhering lumps or particles of sod and earth, and in practice it will be necessary to employ or combine in the machine in suitable relation thereto a means for cleaning these surfaces from such matter. For such purpose I have provided a set of brushes to press or bear against the surface of the cylinder as it revolves, and thus dislodge and remove the adhering lumps and particles from between the points or teeth and from the surface of the plates. These brushes are set in the stationary block $t$, that is fixed in the frame over the top and front portion of the harrow, and are held by it in position to operate against the segment-plates as the cylinder carries them upward. A second or additional set of such brushes can be applied, also, to operate upon the top and the rear portion of the cylinder-surface, as shown in the drawings, Fig. 4. By thus removing the dirt and other adhering matter from the plates as they are drawn upward and closed against the cylinder, I keep the joints and hinges clear and free and prevent clogging or other derangement of the harrow.

A movement of the cylinder-shaft up and down to bring the harrow out of and into action—such as in raising it over obstructions or in lifting it clear of any portion of surface while being moved along upon the ground—is provided for in the manner shown in Fig. 3. This view is an enlarged detail, showing the bearing that supports the end of the cylinder-shaft in the frame A, the driving-pinion $m$ employed on the end of the shaft being taken off to disclose the parts behind it. This bearing is a disk, U, having an eccentric slot, $s$, in which is inserted the end portion of the cylinder-shaft H. A portion of the periphery of this bearing-disk is furnished with a toothed segment, $v$, into which a pinion, W, is caused to mesh by being held in a bearing in the frame just above the disk. Now, by giving rotation to this pinion in one direction, the disk will be turned backward a certain distance and lift the shaft H, so as to lift the harrow clear of the ground, and by rotating it in the opposite direction the disk will allow the shaft to drop down into working position. One of these disks is placed at each end of the harrow-shaft, and they are fixed in circular openings or boxes in the side frames in such manner that while they can turn freely around within the frame they are prevented from slipping out or shifting laterally. A simple way of fixing them in the frame is to make the circular opening in it somewhat smaller in diameter than the disk U, and then to turn down on the inner face of the disk a hub of proper size to fit the bearing in the frame and be free to turn in it, and then, when placed in the circular opening, to secure it from slipping or being drawn out laterally from its bearing by fixing a flange plate or disk of about the same diameter as the bearing-disk to the inner face against the hub and securing it by screws, so that between this plate on the inside and the bearing-disk on the outside the frame is held and confined as in a circular groove.

To turn both disks simultaneously and lift or move the harrow-shaft equally at both ends, I carry a shaft, Y, across the frame above and parallel with the shaft H, and then provide bearings $z$ for it in the side frames in such relation to the other pinions, W, that by fixing upon the ends of this shaft the pinions $y$ these shall engage with the pinions W and also with the large gear wheels or rings $g\ g$. Through the agency of these small pinions $y$, then, the movements of the large driving-gears $g$ are transmitted to the pinions W, by which the disk-bearings U are rotated in the frame. The shaft carrying these pinions $y$ is held in slotted bearings $z$ in the side frames, and is capable of being moved or shifted forward and backward to throw its pinions into and out of engagement with the gears $g\ g$ on the rear axle. This movement is readily effected from the driver's seat on the machine through the medium of the forked arm $a$, the upright arm $d$ projecting from it at the fulcrum-point $e$, the connecting-rod extending forward to the front of the machine, and the hand-lever $f$, pivoted to the frame at $h$. By drawing forward this hand-lever the shaft will be thrown backward in its slotted bearings, and its pinions $y$ will be brought into action with the gear-wheel $g$, so that a rotation of the disks U is then produced to lift the harrow-shaft.

The frame A is adapted to receive in front of the harrow-cylinder B a seed-distributing hopper, 1, which I provide substantially of the form shown in Figs. 1, 4, and 6, for the purpose of casting seed, grain, or fertilizing matter in front of the pulverizing and raking mechanism. This distributer consists of a receiving-hopper, 1, from which diverging channels 2 are carried backward and with a downward slope to the rear of a chamber, 3, where a gate or cut-off, 4, is hinged. Below this chamber an inclined chute, 5, receives and directs the stream of matter to the discharge-spout 6, which extends across the machine from side to side. Within this spout a revolving brush-shaft, 7, is placed and worked with a rapid movement by means of the pulleys on its ends and the belts shown in Fig. 1. By such means the seeds or other matter deposited in the hopper at the back of the driver's seat is spread out into a wide stream and carried down in quantity that is readily controlled to and behind the brush-shaft, which then casts it out from the discharge-opening in a thin, broad stream across the path of the harrow.

The gate or cut-off 4 is adjustable by means of the upright bar 8, fixed to it and projecting upward through the cover of the hopper, and then connected to the end of a regulating-rod, 9, that extends forward to the hopper 1. By making the end of this rod screw-threaded and having it work through a nut, 10, I can move the gate and set it at any desired working position, or shut it altogether.

By such construction of revolving harrow, I provide a machine that is adapted to sow and work in manures or fertilizing matter in a thorough and effective manner, and to serve the purposes of the farmer in his operations of sowing and harrowing in grain in a more economical and at the same time efficient manner than is possible either in employing separate machines for the different steps of the labor or in using such machines that effect the covering of the grain by rotating cylinders, drums, or simple revolving surfaces with spikes or projections.

Having thus fully described my invention, what I claim, and desire to secure by Letters Patent, is—

1. In a revolving harrow and earth-pulverizer, the cylindrical frame having a surface composed of curved toothed plates or segments conforming to the circumference of the cylinder, and hinged on one side to and adapted to swing out from said cylinder during certain portions of its revolutions, the cylinder being arranged to revolve backward during the progress of the machine, substantially as set forth.

2. In combination with the cylindrical frame or body B, supported and capable of rotation in a carrying-frame, substantially as described, the curved segmental plates or sections J, having teeth $r$ $r$ thereon, hinged or otherwise loosely connected at one edge or side to the said cylindrical frame forming the exterior surface of the frame when closed, and mechanism for imparting to the said frame a rotary motion in a backward direction during its travel or progression over the surface of the ground, substantially as hereinbefore set forth.

3. In combination with the cylinder-shaft H, the eccentrically-slotted disk-bearings U, having the toothed-segment portions, the pinions W, to engage with the said segments, the shifting pinions $y$, the gears $g$ on the rear axle, and means, substantially as herein described, for throwing the said shifting pinions into and out of gear with the driving-gears, for the purpose set forth.

4. The herein-described supporting-frame for the working parts of the apparatus, composed of the goose-neck $b$, adapted to rest in front upon the front axle, and rising therefrom, and having the two divergent sides or arms $b'$ $b'$ extended backward and downward and parallel with each other, as shown, and terminating in the axle-boxes $c$ $c$, substantially as set forth.

In witness that I claim the foregoing I have hereunto set my hand and seal.

BUDD SMITH. [L. S.]

Witnesses:
EDWARD E. OSBORN,
GEO. VINCENT.